United States Patent
Tangue et al.

[15] 3,692,004
[45] Sept. 19, 1972

[54] FAN SHROUD AND FLUID RECEPTACLE ARRANGEMENT

[72] Inventors: Duane R. Tangue, Linden; Gerald A. McNalley, Vassar, both of Mich.

[73] Assignee: General Motors Corporation, Detroit, Mich.

[22] Filed: May 3, 1971

[21] Appl. No.: 139,678

[52] U.S. Cl............123/41.57, 123/41.49, 180/68 R, 165/122
[51] Int. Cl................................................F01p 9/04
[58] Field of Search..123/41.57, 41.49, 41.48, 41.14, 123/41.51, 41.1; 165/122; 180/68 R

[56] References Cited

UNITED STATES PATENTS

| | | | |
|---|---|---|---|
| 1,312,476 | 8/1919 | Ford | 123/41.49 |
| 2,728,411 | 12/1955 | Pasturczak | 123/41.49 |
| 2,668,523 | 2/1954 | Lamb | 123/41.49 |
| 2,887,097 | 5/1959 | Huffman | 123/41.51 |
| 1,311,528 | 7/1919 | Muir | 123/41.49 |

*Primary Examiner*—Martin P. Schwadron
*Assistant Examiner*—R. H. Lazarus
*Attorney*—Warren E. Finken, A. M. Heiter and John P. Moran

[57] ABSTRACT

An engine cooling system wherein a fan shroud and fluid receptacle arrangement includes a rectangularly-shaped fan shroud having a cylindrical band or collar extending away from the radiator and a radiator fluid overflow receptacle and a windshield washer fluid receptacle integrally molded on opposite side surfaces of the cylindrical band or collar. The result is a compact one-piece arrangement which: (1) eliminates the need for space and fastening means for three different components; (2) eliminates the need for retooling for different component designs for specific vehicle models; (3) provides a substantial cost saving; and (4) prevents the shroud from becoming vibrated or excited by the rotating fan and caused to create noise by virtue of rigidity reinforcement provided in part by the receptacle structures and dampening provided by the fluids therein.

7 Claims, 7 Drawing Figures

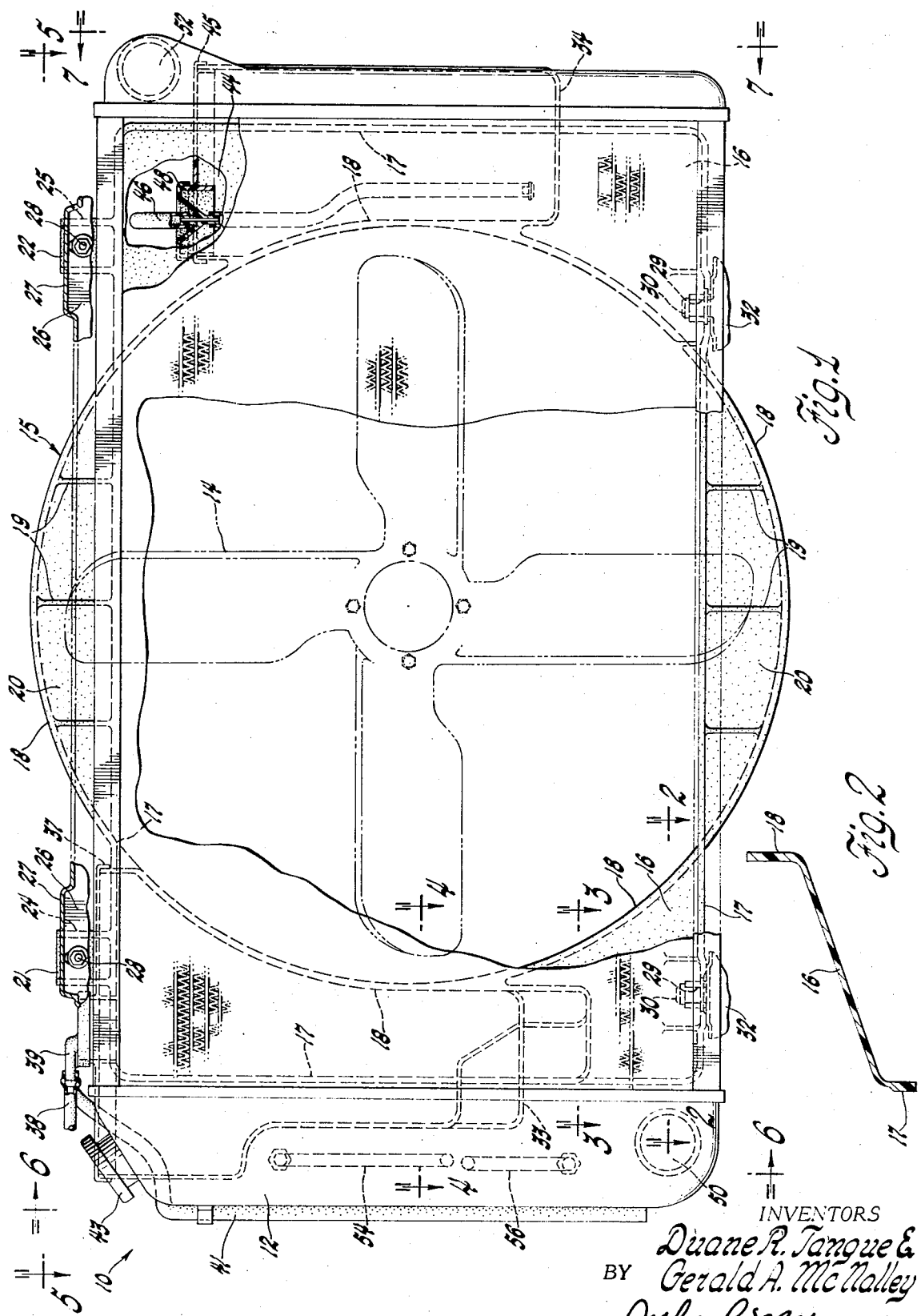

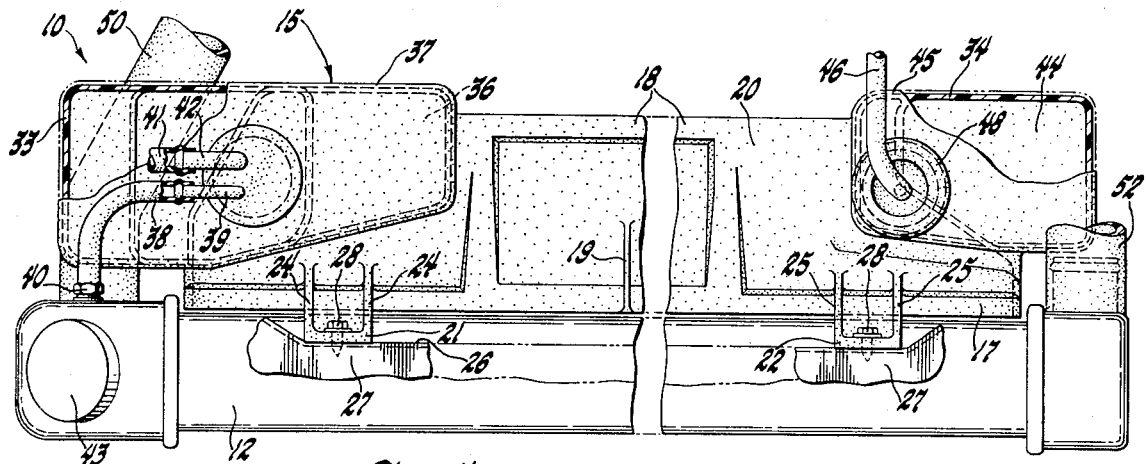
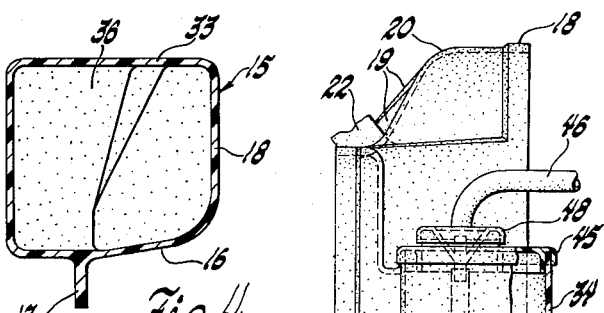
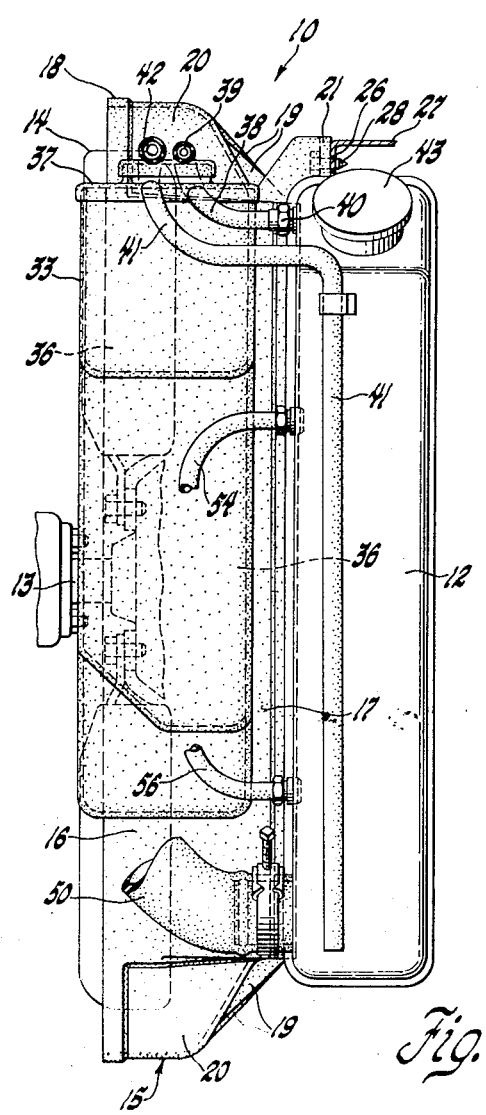
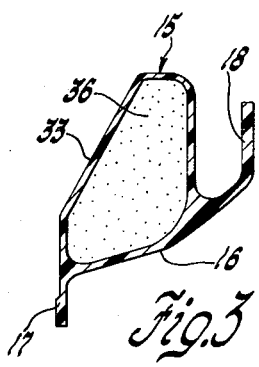
INVENTORS
Duane R. Tangue &
BY Gerald A. McNalley
John P. Moran
ATTORNEY

3,692,004

FAN SHROUD AND FLUID RECEPTACLE ARRANGEMENT

This invention relates generally to cooling devices and more particularly to an automobile fan shroud and fluid receptacle arrangement for use with an engine cooling fan.

Cooling and related reservoir systems heretofore have embodied a multipiece configuration, generally including a fan shroud and separate windshield washer fluid and radiator fluid overflow receptacles.

The invention proposed herein provides an improved one-piece molded fan shroud arrangement which incorporates a fan shroud and integrally molded radiator fluid overflow and windshield washer fluid receptacles, thereby reducing cost, saving space and increasing overall rigidity.

Accordingly, an object of the invention is to provide a one-piece fan shroud arrangement wherein a radiator fluid overflow compartment and a windshield washer fluid compartment are integrally molded on opposite side surfaces of a fan shroud formed by a wall and a central flanged opening, with portions of the wall and central flanged opening forming two adjacent walls of each compartment.

Another object of the invention is to provide a compact, one-piece fan shroud and fluid receptacle arrangement, resulting in: (1) the elimination of the need for space and fastening means for three separate components; (2) cost savings by virtue of having eliminated the need to manufacture three separate parts, while utilizing heretofore unused surface areas of the fan shroud; (3) the elimination of the need for retooling for different designs for specific vehicle models; (4) larger capacity windshield washer compartment; and (5) a radially and axially rigid structure.

These and other objects and advantages of the invention will become apparent when reference is made to the following description and accompanying drawings, wherein:

FIG. 1 is a fragmentary end view of the invention;

FIG. 2 is a cross-sectional view taken along the plane of line 2—2 of FIG. 1, and looking in the direction of the arrows;

FIGS. 3 and 4 are enlarged cross-sectional views taken along the planes of lines 3—3 and 4—4, respectively, of FIG. 1, and looking in the direction of the arrows; and FIGS. 5, 6, and 7 are views taken along the planes of lines 5—5, 6—6, and 7—7, respectively, of FIG. 1, and looking in the direction of the arrows.

Referring now to the drawings in greater detail, FIGS. 1 and 5 illustrate an engine cooling system 10, including a cross-flow radiator 12, an engine cooling fan 14 and a fan shroud arrangement 15. The fan 14 is mounted on a shaft 13 conventionally mounted on the front of an engine (not shown). As illustrated in FIG. 2, the fan shroud arrangement 15 includes a rectangularly-outlined, contoured wall 16 having a rectangular, transversely extending flange 17 formed around the outer periphery thereof and a central cylindrical flange or collar portion 18 formed thereon, serving as the edge of the central opening in the wall 16 and extending transversely from the plane of the radiator 12. The rectangular and cylindrical flange portions 17 and 18, respectively, are spaced axially apart from one another a predetermined distance, the contoured wall 16 extending across the predetermined distance and generally radially inwardly from the rectangular flange portion 17 to the cylindrical flange portion 18 and serving as a funnelling means for directing the air to the fan 14. The fan 14 is mounted radially within the collar 18 and the collar 18, along with the contoured wall 16, serves as the fan shroud. The cylindrical collar 18 stiffens the wall 16, particularly at the central opening. A plurality of ribs 19 serve to stiffen upper and lower arcuate-shaped connector sections 20, extending from the flange 17 to help support the fan shroud collar portion 18, where the latter extends respectively above and below the flange 17.

A pair of tabs or ears 21 and 22 are integrally molded on the upper portion of the flange 17 of the wall 16, each braced by a pair of reinforcement ribs 24 and 25, respectively, integral with the wall 16 and the flange 17, on opposite sides of the upper connector section 20. The tabs 21 and 22 are located adjacent a flange 26 extending from the frame 27 of the radiator 12. Screws 28 connect the tabs 21 and 22 to the flange 26, thus securing the top of the fan shroud arrangement 15 to the radiator 12. A pair of oppositely disposed openings 29 (FIG. 1) are formed in the portion of the flange 17 formed along the bottom edge of the wall 16 and projecting transversely from the wall 16 on the side opposite the shroud collar 18 for mounting of the shroud arrangement 15 on a pair of pins 30 secured to the vehicle body, represented at 32.

A pair of translucent open-topped compartments or receptacles 33 and 34 are integrally molded on opposite sides of the collar portion 18 of the fan shroud arrangement 15. The compartment 33 is located on the left side of the collar portion 18, as viewed from the front of the vehicle, and has formed therein a chamber 36 suitable for receiving and/or storing up to nine pints of radiator fluid. As illustrated in FIGS. 1 and 4, the chamber 36 is formed with a variable cross section, with the wall 16 and a side of the shroud collar 18 forming approximately two walls or a substantial portion of its total wall surface to a point well below the center of the collar portion 18. FIG. 3 illustrates the bottom portion of the chamber 36 which extends tangentially downwardly (FIG. 1) from the edge of the shroud collar 18 at a point on a line drawn horizontally through the center thereof. A lid 37 snaps in place on the open top of the compartment 33 to form the top of the chamber 36.

As shown in FIGS. 5 and 6, a first hose 38 interconnects an inlet fitting 39 and an overflow fitting 40 formed on the compartment 33 and the radiator 12, respectively. A second hose 41 and an outlet fitting 42 serve to vent the chamber 36 to atmosphere. A radiator cap 43 is mounted on the radiator 12 adjacent the compartment 33.

The compartment 34 is located to the right side of the fan shroud collar 18 in FIG. 1, as viewed from the front of the vehicle, and has formed therein a chamber 44 suitable for storing a predetermined volume, say, 5 pints, of windshield washer fluid. A lid 45 snaps in place on the open top of the compartment 34 to form the top of the chamber 44. An outlet hose 46 extends through a cap 48 mounted on top of the lid 45 into the chamber 44. Just as in the case of the chamber 36, the side of the shroud collar 18 (FIG. 1) and the adjacent wall 16 form approximately two walls or a substantial portion of the total wall surface of the chamber 44.

Hence, the fluid-containing receptacles or compartments 33 and 34 on the wall 16 and the shroud collar 18 add substantially to the radial and axial rigidity of the overall structure by virtue of the transverse relationship of the integral plastic shroud wall, the shroud collar wall and the container walls and the fluid contained therein, providing axial and radial reinforcement for the shroud wall 16, the flange 17 and the shroud collar 18 is compactly located between the radiator and the engine.

The usual lower left (FIG. 1) radiator outlet and upper right inlet hoses 50 and 52, respectively, are connected between the radiator 12 and the vehicle engine (not shown). A pair of hoses 54 and 56 (FIG. 6) on the radiator 12 are the usual inlet and outlet hoses, respectively, leading to and from the conventional automotive heater (not shown).

It should be apparent that the invention provides a compact cooling system structure which eliminates the need for space and fastening means for three separate components in the already crowded engine compartment of today's automobile. It provides substantial cost savings by virtue of having eliminated the need to manufacture and assemble three separate parts, while utilizing heretofore unused surface areas of the fan shroud. Additionally, the invention provides a standard or uniform structure which is unaffected by new vehicular designs. Specifically, the shape of the compartments 33 and 34 need not be redesigned each time the fender wells and other interior parts are changed on new vehicle models. Also, the integrally molded windshield washer fluid compartment may have a larger capacity than the previously employed separate washer fluid container. Furthermore, the resultant structure is extremely rigid, both radially and axially, and damped by fluid in the receptacles, reducing vibration or excitation of the fan shroud caused by the rotating fan surrounded thereby, hence diminishing a source of bothersome noise.

While but one embodiment of the invention has been shown and described, other modification thereof are possible.

We claim:

1. A fan shroud and receptacle arrangement for use with an automotive radiator and comprising a rectangularly-outlined wall portion having outer peripheral flange and central cylindrical collar portions axially extending in opposite directions from said wall portion, top and bottom arcuate portions extending generally upwardly and downwardly, respectively, from the upper and lower portions of said flange portion to said cylindrical collar portion, first securing means formed on the top portion of said flange on opposite sides of said top arcuate portion for securing said fan shroud and receptacle arrangement to said radiator, second securing means formed on the bottom portion of said flange on opposite sides of said bottom arcuate portion for mounting purposes, a first compartment having two sides thereof formed as integral parts of said wall and collar portions, a second compartment having two sides thereof formed as integral parts of said wall and collar portions.

2. A one-piece molded plastic radiator fan shroud and fluid-containing receptacle structure for use with an automotive radiator and comprising a rectangularly-outlined wall portion having an outer peripheral reinforcing means for engaging said radiator and a central tubular shroud collar portion for closely surrounding a fan axially extending in opposite directions from said wall portion, top and bottom arcuate shroud portions extending generally upwardly and downwardly, respectively, from the upper and lower portions of said peripheral reinforcing means to said tubular shroud collar portion, securing means on said peripheral reinforcing means on opposite sides of said tubular shroud collar portion for securing said structure to said radiator, and a fluid-containing receptacle portion of said one-piece molded plastic structure having side walls and at least one end wall with one side thereof formed by a part of said wall portion and another side formed by a part of said tubular shroud collar portion and extending transversely to said one side and additional side portions completing the fluid-containing receptacle having one extending substantially transversely to said wall portion, one extending transversely to said tubular shroud collar portion and one extending transversely to said wall and shroud portions to provide reinforcing for said wall and shroud structure and a fluid-containing receptacle.

3. A one-piece molded plastic radiator fan shroud and fluid-containing receptacle structure for use with an automotive radiator and comprising a rectangularly-outlined wall portion having an outer peripheral reinforcing flange portion for engaging said radiator and a central tubular shroud collar portion for closely surrounding a fan axially extending in opposite directions from said wall portion, top and bottom arcuate portions extending generally upwardly and downwardly, respectively, form the upper and lower portions of said flange portion to said tubular shroud collar portion, securing means on said upper portion of said flange portion on opposite sides of said tubular shroud collar portion for securing said structure to said radiator, securing means on said bottom portion of said flange portion on opposite sides of said tubular shroud collar portion for mounting purposes, and a fluid-containing receptacle portion of said one-piece molded plastic structure having said walls and at least one end wall with one side thereof formed by a part of said wall portion and another side formed by a part of said tubular shroud collar portion and extending transversely to said one side and additional side portions completing said fluid-containing receptacle having one extending substantially transversely to said wall portion, one extending substantially transversely to said tubular shroud collar portion and one extending transversely to said wall and shroud collar portions to provide reinforcing for said wall and shroud structure and a fluid-containing receptacle.

4. A fan shroud and receptacle arrangement for use with an automotive radiator and comprising a rectangularly-outlined wall portion having outer peripheral flange and central cylindrical collar portions axially extending in opposite directions from said wall portion, said flange and collar portions being spaced axially apart from one another a predetermined distance and said wall portion being contoured to extend across said predetermined distance and generally radially inwardly from said flange portion to said collar portion, upper and lower connector sections extending generally upwardly and downwardly, respectively, from the upper and lower portions of said flange portion to said cylindrical collar portion, a pair of tabs formed on said flange on opposite sides of said upper connector section for securing said pair of tabs to said radiator, a pair of openings formed on said flange on opposite sides of said lower connector section for mounting purposes, a first compartment having two sides thereof formed as integral parts of said wall portion and one side of said collar portion, a second compartment having two sides thereof formed as integral parts of said wall portion and the opposite side of said collar portion.

5. A fan shroud and receptacle arrangement for use with an automotive radiator and comprising a rectangularly-outlined wall portion, a central cylindrical shroud portion axially extending from said wall portion away from said radiator, top and bottom edge flanges formed along said wall portion extending toward and abutting said radiator, a pair of oppositely disposed tabs formed on said top edge flange, bracket means formed on said radiator, a pair of fasteners for securing said pair of tabs to said bracket means on said radiator, a pair of spaced upwardly extending pins fixed relative to said radiator, a pair of oppositely disposed openings formed on said bottom edge flange for mounting on said upwardly extending pins, a first open-top compartment having portions of two sides thereof formed as an integral part of said wall and cylindrical shroud portions, a second open-top compartment having portions of two sides thereof formed as an integral part of said wall and cylindrical shroud portions, and first and second lid members mounted on the open tops of said first and second compartments, respectively.

6. A fan shroud and receptacle arrangement for use with an automotive radiator and comprising a rectangularly-shaped contoured wall portion, a central cylindrical flange portion axially extending from said wall portion, axially extending rectangular flanges formed around the edges of said contoured wall portion, a pair of tabs formed on said rectangular flange on opposite sides of the top portion of said cylindrical flange portion, a pair of fasteners for securing said pair of tabs to said radiator, a pair of spaced upwardly extending pins fixed relative to said radiator, a pair of openings formed on said flange on opposite sides of the bottom portion of said cylindrical flange portion for mounting on said upwardly extending pins, a first compartment having portions of the sides thereof formed as an integral part of said wall and cylindrical flange portions, first and second lid members mounted on top of said first and second compartments, respectively, a cap mounted on said second lid member, first hose means communicating between said first compartment and said radiator, and second hose means extending into said second compartment through an opening formed in said cap.

7. An automotive engine cooling system comprising a radiator, a fan shroud arrangement and an engine cooling fan operatively connected to said radiator, said fan shroud arrangement including a rectangularly-shaped wall portion, a central cylindrical shroud portion axially extending from said wall portion, said engine cooling fan being rotatably mounted radially within said central cylindrical shroud portion, a flange formed around the perimeter of said rectangularly-shaped wall portion, a pair of oppositely disposed tabs formed on the top portion of said flange, a pair of fasteners for securing said pair of tabs to said radiator, a pair of spaced upwardly extending pins fixed relative to said radiator, a pair of oppositely disposed openings formed on the bottom portion of said flange for mounting on said upwardly extending pins, a first compartment having two sides thereof formed as an integral part of one side of said wall and shroud portions, a second compartment having two sides thereof formed as an integral part of the opposite side of said wall and shroud portions, first and second lid members mounted on top of said first and second compartments, respectively, a cap mounted on said second lid member, first hose means communicating between said first compartment and said radiator, second hose means extending through an opening formed in said cap, a first inlet opening formed in said radiator, a radiator cap mounted on said first inlet opening, and an outlet opening and a second inlet opening formed in said radiator adjacent oppositely disposed ends thereof.

* * * * *